(12) United States Patent
Brück

(10) Patent No.: US 7,261,865 B2
(45) Date of Patent: Aug. 28, 2007

(54) HEATABLE HONEYCOMB BODY WITH TWO DIFFERENT COATINGS

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 859 days.

(21) Appl. No.: 10/391,843

(22) Filed: Mar. 18, 2003

(65) Prior Publication Data

US 2003/0161766 A1    Aug. 28, 2003

Related U.S. Application Data

(63) Continuation of application No. PCT/EP01/12064, filed on Oct. 18, 2001.

(30) Foreign Application Priority Data

Oct. 18, 2000    (DE) .................. 100 51 562

(51) Int. Cl.
*B01D 50/00*    (2006.01)
*B01D 53/34*    (2006.01)

(52) U.S. Cl. ............... 422/180; 422/173; 422/174; 422/177; 228/203; 228/176; 60/299; 60/300; 502/62; 502/64; 502/66; 219/552

(58) Field of Classification Search ............. 422/177, 422/180, 174
See application file for complete search history.

(56) References Cited

U.S. PATENT DOCUMENTS 5,146,743 A    9/1992    Maus et al. ............ 60/274
5,296,198 A    3/1994    Abe et al. ............. 422/180
5,411,711 A    5/1995    Swars .................. 422/177
5,465,573 A    11/1995   Abe et al. .............. 60/274
5,480,621 A    1/1996    Breuer et al. .......... 422/174
5,538,698 A    7/1996    Abe et al. ............. 422/174
5,914,090 A    6/1999    Gottberg ............... 422/171
6,025,578 A    2/2000    Brück et al. ........... 219/541
6,113,864 A    9/2000    Kueper et al. .......... 422/180

FOREIGN PATENT DOCUMENTS

| DE | 43 39 025 A1 | 6/1994 |
| DE | 43 39 424 A1 | 6/1995 |
| EP | 0 485 179 A2 | 5/1992 |
| EP | 0 485 179 B1 | 5/1992 |
| EP | 0 541 585 B1 | 5/1993 |
| EP | 0 661 098 A2 | 7/1995 |

*Primary Examiner*—Glenn Caldarola
*Assistant Examiner*—Kaity Handal
(74) *Attorney, Agent, or Firm*—Laurence A. Green; Werner H. Stemer; Ralph E. Locher

(57) ABSTRACT

An electrically heatable honeycomb body, in particular for cleaning exhaust gas originating in an internal combustion engine. The honeycomb body has at least two zones arranged in series in the flow direction with different coatings. The honeycomb body preferably has a first zone and a second zone which is arranged downstream, the first zone having an adsorbing coating, and the second zone having a catalytically active coating. The electrically heatable honeycomb body serves in particular as a trap for pollutants, preferably hydrocarbons or nitrogen oxides, which are contained in the exhaust gas. The configuration of the adsorbing first zone is matched to the light-off performance of the electrically heatable honeycomb body.

16 Claims, 3 Drawing Sheets

– 1 –

HEATABLE HONEYCOMB BODY WITH TWO DIFFERENT COATINGS

CROSS-REFERENCE TO RELATED APPLICATION

This application is a continuation of copending International Application No. PCT/EP01/12064, filed Oct. 18, 2001, which designated the United States and was not published in English.

BACKGROUND OF THE INVENTION

Field of the Invention

The invention lies in the field of honeycomb bodies and relates, more specifically, to an electrically heatable honeycomb body, in particular for cleaning an exhaust gas from an internal combustion engine. The electrically heatable honeycomb body has at least two zones which are arranged in series in the prevailing flow direction. Electrically heatable honeycomb bodies of this type are used in particular to lower the emissions of pollutants during the cold-starting phase of an internal combustion engine, such as for example an engine of a motor vehicle.

A metallic embodiment of an electrically heatable honeycomb body has been described, for example, in European patent EP 0 541 585 B1 (U.S. Pat. No. 5,411,711). There, exemplary embodiments are shown with sheet-metal stacks that are wound in an S shape and wherein electrical contact is made via outer half-shells. In that case, continuous metallic support structures which project into the interior of the honeycomb body provide mechanical stability under high operating loads. At the same time, uniform distribution of the electric current in the honeycomb body when a voltage is applied is achieved by suitable dimensioning of the support structures and corresponding selected contacts with the sheet-metal stacks. Furthermore, it is known from the document to provide the electrically heatable honeycomb body with a catalytically active coating. In view of the fact that it is used during the cold-start phase, the coating is preferably formed with a coating that principally has an oxidizing action, for example vapor-deposited platinum and/or rhodium.

A ceramic embodiment of an electrically heatable honeycomb body is described, for example, in European patent specification EP 0 485 179 B1 (U.S. Pat. No. 5,296,198). A gas which is to be heated can flow through the honeycomb body described in that document, and the honeycomb body comprises at least two electrodes for electric current to flow through in order to heat the honeycomb body. The document further proposes to coat the electrically heatable honeycomb body with a composition comprising an absorber material and a catalytically active material. The absorber material is intended to trap the hydrocarbons which are generated during the cold-start phase and have not been completely burned until the catalytically active coating together with the electrically heatable honeycomb body has been heated to a temperature at which chemical conversion of these hydrocarbons is possible.

SUMMARY OF THE INVENTION

It is accordingly an object of the invention to provide an electrically heatable honeycomb body, which overcomes the above-mentioned disadvantages of the heretofore-known devices and methods of this general type and which has a coating that is matched to the light-off performance of the electrically heatable honeycomb body, in order to effectively lower the emissions of pollutants in the cold-start phase of an internal combustion engine.

With the foregoing and other objects in view there is provided, in accordance with the invention, an electrically heatable honeycomb body, in particular a honeycomb body for purifying the exhaust gas of an internal combustion engine, which comprises at least two zones arranged in series in a flow direction, the at least two zones having mutually different coatings.

There is also provided, in accordance with the invention, a catalytic converter assembly, comprising a carrier body having an electrically heatable honeycomb body as outlined above and a main catalytic converter disposed downstream of the heatable honeycomb body in a flow direction.

In other words, the electrically heatable honeycomb body according to the invention has at least two zones which are arranged in series in the flow direction and is used in particular to clean the exhaust gas from an internal combustion engine. The electrically heatable honeycomb body is distinguished by the fact that the at least two zones each have different coatings. The various coatings have different functions in particular during the cold-start phase of an internal combustion engine. The functions of the coatings are, for example, to adsorb pollutants, to catalytically convert pollutants or to oxidize exhaust-gas constituents. While in the case of the known electrically heatable honeycomb bodies it has always been attempted to combine these different functions in one coating composition, it is now proposed, according to the invention, for the coatings to be spatially separate from one another in accordance with their functions. This is particularly advantageous, since coatings arranged in this manner do not have any adverse effect on one another. Particularly during the cold-start phase, coatings whose functions are substantially influenced by the temperature are used. During the interaction of coating and exhaust gas, in some cases exothermic reactions take place, which influence the light-off performance or heating of the honeycomb body and therefore also, if appropriate, the reaction performance of other coatings. The arrangement of different coatings in zones which are connected in series in the flow direction avoids undesirable effects of this nature.

In accordance with an additional feature of the invention, the electrically heatable honeycomb body, the first zone has a coating comprising absorber material, and the second zone has a catalytically active coating. When cleaning an exhaust gas using such a combination of electrically heatable honeycomb body with a first coating comprising absorber material and a second catalytically active coating, particularly during the light-off phase of the honeycomb body, a large number of chemical reactions, at least some of which interact with one another in very complex ways, take place. These interactions are described below, revealing the advantages of the different coatings being arranged spatially separately.

To convert pollutants in an exhaust gas, catalytically active surfaces or coatings which lead to chemical conversion of the pollutants (carbon monoxide, hydrocarbons, nitrogen oxide) over a certain temperature (approx. 250° C.), are used. The time until this light-off temperature is reached is shortened by the use of an electrically heatable honeycomb body. Therefore, the catalytically active surface or coating is heated not only by the hot exhaust gas from a combustion operation but also by the heat of resistance. To comply with increasingly stringent exhaust-gas restrictions throughout the world, however, it is necessary for there to be only a very low emission of hydrocarbons even immediately after the cold start. The use of an absorber material which is responsible for storing hydrocarbon molecules produced during the cold start is suitable for this purpose.

During a rise in temperature, an absorber material of this type is distinguished by two different phases: an adsorption phase and a desorption phase. Immediately after the cold start of the internal combustion engine, by way of example the hydrocarbons are taken up in a generally fissured surface structure of the absorber material. The strength of bonding of the hydrocarbons to the absorber material is dependent on the type of molecules and on the structure of the absorber material (adsorption phase). As the exhaust-gas and/or honeycomb body temperature rises, the hydrocarbons stored in the absorber material are desorbed (desorption phase). This takes place in particular at temperatures of between 100° C. and 200° C. Furthermore, it can be seen that the absorber material is desorbed even at temperatures at which complete catalytic conversion of the desorbed hydrocarbons is not ensured.

Investigations concerning the light-off performance of an electrically heatable honeycomb body through which an exhaust gas flows have shown that, during the cold-start phase, a temperature profile which substantially rises in the flow direction is established over the axial length of the honeycomb body (cf. also FIG. 2). Consequently, during the cold-start phase, the electrically heatable honeycomb body has a first zone which is at lower temperatures than a downstream second zone. According to the invention, it is proposed to coat the first, cooler zone with an absorber material and to provide the second, hotter zone with a catalytically active coating. This particularly preferred arrangement has the advantage that the two coatings are at different temperatures at the same time of the cold-start phase; a suitable temperature for catalytic conversion can already be provided in the downstream, catalytically active coating before the absorber material in the cooler, first zone reaches its desorption phase. The result is a particularly effective heatable honeycomb body, which in particular during a cold-start phase of the internal combustion engine prevents the emission of pollutants into the environment.

In accordance with again an added feature of the invention, the absorber material coating is configured with a zeolite structure. Zeolites are microporous aluminosilicates (aluminum-silicon crystals), which have the property of being able to take up certain molecules. The zeolite structure comprises a tetrahedral framework with channels and/or cavities, the geometry of which is characteristic of a zeolite. The structure of a zeolite makes it particularly suitable for attracting hydrocarbons.

According to yet a further configuration, the electrically heatable honeycomb body has sheet-metal layers, which are at least in part structured in such a way that an exhaust gas can flow through them. An electrically heatable honeycomb body with sheet-metal layers has the advantage that, for the same volume, it has a larger surface area for adsorption or catalytic conversion of the pollutants and a lower pressure loss compared, for example, to a ceramic honeycomb body.

In this case, it is particularly advantageous for the sheet-metal layers to be designed with metal sheets which have a thickness of less than 0.08 mm. These relatively thin metal sheets ensure a low heat capacity, with the result that only a very small amount of thermal energy is extracted from the exhaust gas. The metal sheets are preferably less than 0.04 mm, in particular less than 0.02 mm, thick.

According to yet a further configuration, the honeycomb body has channels through which an exhaust gas can flow, the number of channels being greater than 400 cpsi (cells per square inch), in particular greater than 600 cpsi. A large number of channels provides, for a constant volume, a large surface area, with the result that, for example, the adsorption capacity of the coating comprising absorber material or the catalytic conversion of the pollutants is improved.

According to a further configuration of the electrically heatable honeycomb body, the first zone has an axial first length of less than 20 mm. Because the light-off temperature for catalytic conversion of the pollutants in the exhaust gas is reached rapidly by the coating in the second zone, the pollutants only have to be stored for a very short time. Consequently, only a relatively narrow disk with a coating comprising absorber material is required. A first zone comprising absorber material with an axial length of at most 20 mm provides sufficient adsorption capacity to ensure that the emission of pollutants into the environment is prevented.

A further aspect of the invention proposes a carrier body having a heatable honeycomb body in accordance with the invention, the honeycomb body having electrically insulating layers and being connected in an electrically conductive manner to at least one electrode, in such a manner that a predeterminable current path is formed, the honeycomb body being at least partially surrounded by a tubular casing. The tubular casing which surrounds the honeycomb body ensures long-term stability, in particular with regard to the pressure fluctuations which occur in the exhaust-gas flow, and integration of the honeycomb body in an exhaust system. When a voltage is applied to the electrode, a current path which ensures uniform heating of the honeycomb body over its cross section is formed with the aid of the electrically insulating layers.

In this respect, it is also proposed for the at least one electrode to be guided in an electrically insulated manner through the tubular casing. Although in principle in the present invention it is also possible for the tubular casing to be conductively connected to one of the electrodes, for greater freedom during the subsequent incorporation into an electrical supply system, it is particularly advantageous if there is no electrical connection to the tubular casing. This casing then serves only as a protective cladding and a supporting connecting element, for example to the remaining parts of an exhaust system in a motor vehicle.

According to a further configuration of the carrier body, the electrically insulating layers are at least in some cases air gaps. The gaps are to be dimensioned in such a way that electrical insulation is ensured even in the event of pressure waves in the exhaust system and shaking caused by vehicle movement.

In this case, it is particularly advantageous for the electrically insulating layers to be at least partially delimited by support structures. The mainly metallic support structures in the interior of the honeycomb body firstly assist in electrical subdivision of the honeycomb body by means of gaps and secondly contribute to the mechanical stability of the honeycomb body. Relatively thick, mechanically stable support structures prevent electrical short circuits or mechanical overloads. In this case, the gaps can be kept so narrow that they do not impair operation of the honeycomb body. The gaps may, for example, be of a similar order of magnitude to the structure height of the individual metal sheets or the spacing between the sheet-metal layers.

According to yet another inventive aspect, a catalytic converter comprising a carrier body with an electrically heatable honeycomb body is proposed, a main catalyst, in particular a three-way catalyst, being arranged downstream of the carrier body. The main catalyst preferably has a significantly greater volume than the electrically heatable honeycomb body. After the cold-start phase of the internal combustion engine, this main catalyst takes over the catalytic conversion of the pollutants in the exhaust gas. At this time, the electrically heatable honeycomb body has fulfilled its role and can therefore be disconnected from the voltage source.

In this connection, it is particularly advantageous for the carrier body with an electrically heatable honeycomb body to be supported against the main catalyst. This allows the electrically heatable honeycomb body itself to be of relatively fine structure yet nevertheless to withstand the pressure fluctuations which occur in the exhaust-gas flow. Support elements of this nature are preferably distributed over the cross section of an electrically heatable honeycomb body, these elements extending at least partially into the channels of the honeycomb bodies. Particularly in the case of an embodiment of the electrically heatable honeycomb body which has a relatively short overall axial length, this body can also be integrated with the main catalyst in a common tubular casing, the tubular casing serving as a support element.

Other features which are considered as characteristic for the invention are set forth in the appended claims.

Although the invention is illustrated and described herein as embodied in a heatable honeycomb body with two different coatings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
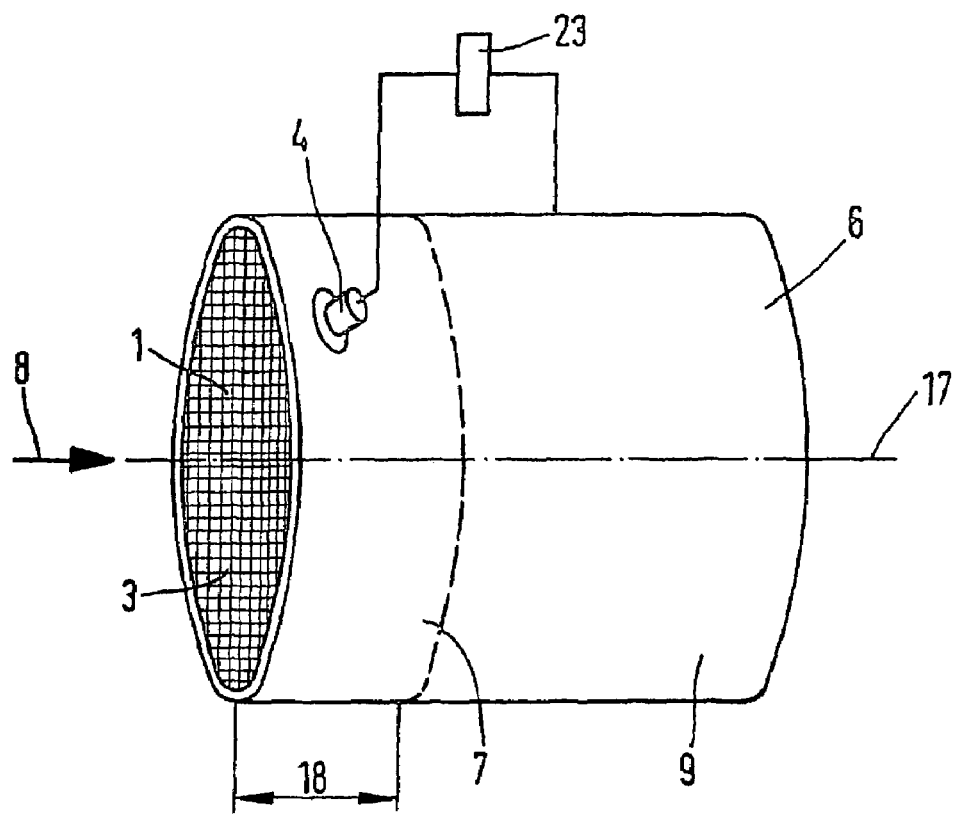
FIG. 1 is a perspective, diagrammatic view of an exemplary configuration of the electrically heatable honeycomb body according to the invention.

Referring now to the figures of the drawing in detail and first, particularly, to FIG. 1 thereof, there is shown a diagrammatic, perspective illustration of an embodiment of an electrically heatable honeycomb body 1 according to the invention. The honeycomb body 1 is used for cleaning an exhaust gas from an internal combustion engine. The electrically heatable honeycomb body 1 has two zones 7 and 9 which are arranged in series in a flow direction 8. The two zones 7 and 9 are provided with respectively different coatings 10 and 11 (illustrated in FIGS. 5 and 6). A central axis is identified with the reference numeral 17. The first zone 7 has a first axial length 18 which is preferably less than 20 mm. The honeycomb body 1 also is formed with channels 3, through which the exhaust gas flows in the flow direction 8 during operation.

The honeycomb body 1 is surrounded by a tubular casing 6, so that the stability of the honeycomb body 1 is considerably increased. The honeycomb body 1 is connected in an electrically conductive manner to an electrode 4. When a voltage is applied in the honeycomb body 1, a predeterminable current path 5, which ensures uniform heating of the honeycomb body 1, is formed with the aid of the electrode 4 and a voltage source 23.

Figure 2:
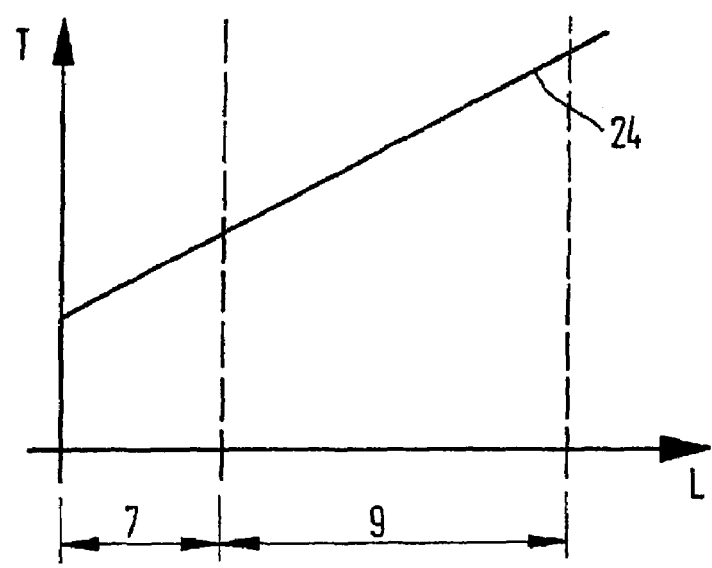
FIG. 2 is a temperature distribution diagram graphed over the axial length of the honeycomb body according to the invention.

FIG. 2 diagrammatically depicts the temperature distribution in the interior of the honeycomb body 1 over the axial overall length L of the honeycomb body 1. In accordance with the graph, the honeycomb body 1 has a temperature which rises in the flow direction 8 during the cold-start phase of the internal combustion engine. Consequently, the first zone 7 is at a lower temperature T than a zone 9 which is arranged downstream (with reference to the flow direction 8). In this case, by way of example, the curve 24 shows a substantially linear relationship between the length of the honeycomb body 1 and the temperature T. The curve 24 is greatly influenced by the "take-up time" during the cold-start phase.

Figure 3:
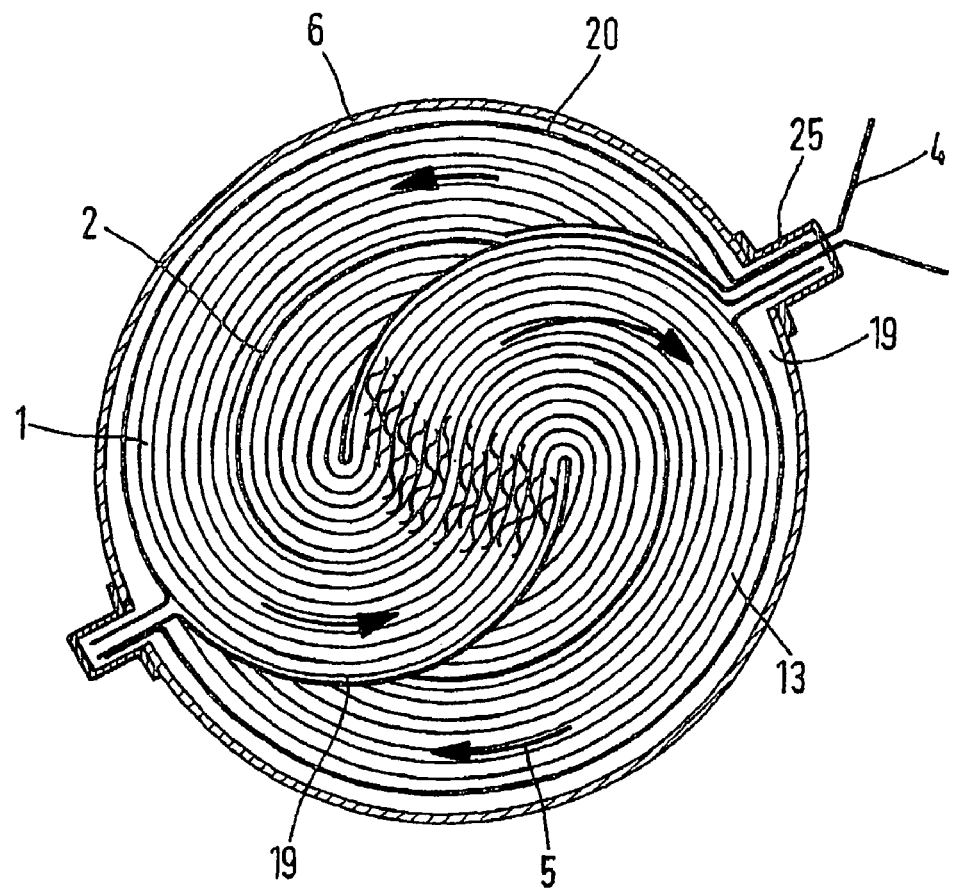
FIG. 3 is a diagrammatic elevational end view of a further configuration of the honeycomb body.

FIG. 3 diagrammatically depicts a further exemplary embodiment of a honeycomb body 1 according to the invention. The honeycomb body 1 has electrically insulating layers 2 and two electrodes 4, which are connected in an electrically conductive manner to the honeycomb body 1 such that a predeterminable current path 5 (indicated with arrows) is formed. The illustration shows a current path 5 which curves in an S shape. The honeycomb body 1 is enclosed by a tubular casing 6, the electrode 4 being guided in an electrically insulated manner 25 through the tubular casing 6. The electrically insulating layers 2 are substantially formed by air gaps 19. To increase the mechanical stability, the honeycomb body 1 additionally has support structures 20. The support structures 20 are also used for the uniform introduction of an electric current into the sheet-metal layers 13.

Figure 4:
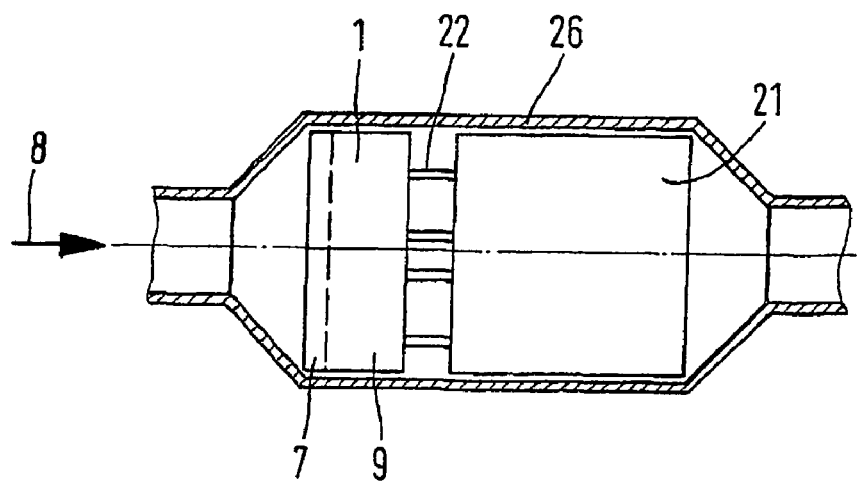
FIG. 4 is a axial section through a honeycomb body according to the invention in an exhaust system.

Referring now to FIG. 4, there is shown, in a diagrammatic depiction, an exhaust system 26, wherein an electrically heated honeycomb body 1 with a first zone 7 and a second zone 9, as well as an additional main catalytic converter 21 are arranged. An exhaust gas flows through the honeycomb body 1 and the main catalytic converter 21 in the flow direction 8. The honeycomb body 1 is braced against the main catalyst 21 by means of a plurality of support elements 22. This ensures permanent fixing of the honeycomb body 1 in the exhaust system 26.

Figure 5:
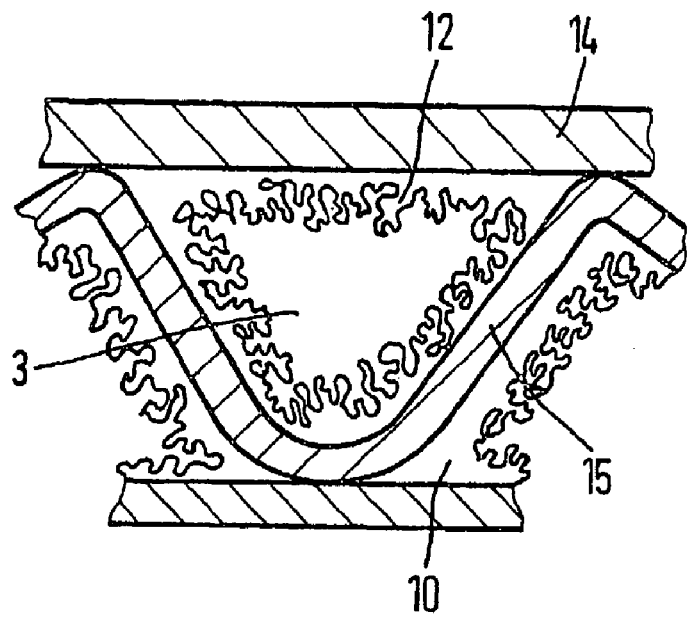
FIG. 5 is a section showing a diagrammatic detail of the honeycomb body according to the invention in the first zone.

FIG. 5 diagrammatically depicts a detail view of the electrically heatable honeycomb body 1 in the first zone 7. The honeycomb body 1 has a plurality of smooth sheet-metal layers 14 and corrugated sheet-metal layers 15, which are (at least in part) structured in such a way that an exhaust gas can flow through them. The stacking of smooth sheet-metal layers 14 and corrugated sheet-metal layers 15 leads to the formation of channels 3 through which the exhaust gas flows. The metal sheets 14 and 15 are provided with a coating comprising absorber material 10. The absorber material 10 has a zeolite structure 12.

Figure 6:
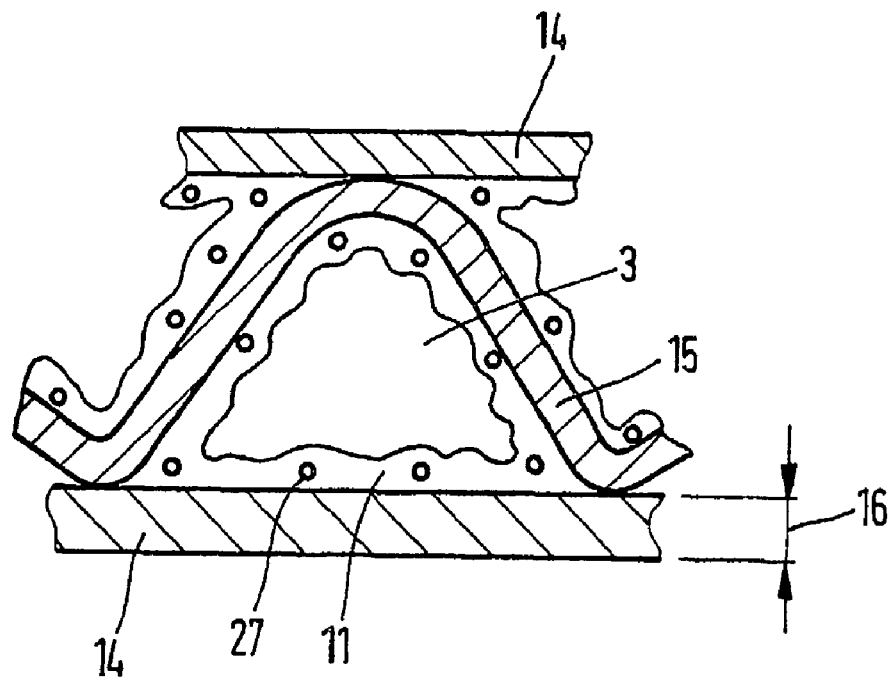
FIG. 6 is a section showing a diagrammatic detail of the honeycomb body according to the invention in the second zone.

FIG. 6 diagrammatically depicts a detail view of the honeycomb body 1 in the second zone 9. The smooth sheet-metal layers 14 and corrugated sheet-metal layers 15 delimit channels 3. The metal sheets 14 and 15 have a thickness 16 and a catalytically active coating 11. The catalytically active coating 11 includes precious metals 27 which, in particular, have an oxidizing action.

The electrically heatable honeycomb body serves in particular as a trap for pollutants, preferably hydrocarbons or nitrogen oxides, which are contained in the exhaust gas, the configuration of the adsorbing first zone being matched to the light-off performance of the electrically heatable honeycomb body. Therefore, the honeycomb body according to the invention prevents pollutants from being emitted into the environment even during the cold-start phase of an internal combustion engine.

I claim:

1. An electrically heatable honeycomb body, which comprises a front face, a rear face separated from said front face by an axial length, channels extending from said front face to said rear face, and at least two zones arranged in series in a flow direction between said front face and said rear face, said at least two zones having mutually different coatings.

2. The electrically heatable honeycomb body according to claim 1, wherein said at least two zones include a first zone with a coating comprising absorber material, and a second zone with a catalytically active coating.

3. The electrically heatable honeycomb body according to claim 2, wherein said coating comprising absorber material has a zeolite structure.

4. The electrically heatable honeycomb body according to claim 1, wherein said at least two zones are defined in a honeycomb body formed of sheet-metal layers at least partially structured such that an exhaust gas can flow through said zones.

5. The electrically heatable honeycomb body according to claim 4, wherein said sheet-metal layers are formed of metal sheets having a thickness of less than 0.08 mm.

6. The electrically heatable honeycomb body according to claim 1, wherein a density of said channels is greater than 400 cpsi.

7. The electrically heatable honeycomb body according to claim 1, wherein the density of said channels is greater than 600 cpsi.

8. The electrically heatable honeycomb body according to claim 1, wherein said first zone has an axial length of less than 20 mm.

9. The electrically heatable honeycomb body according to claim 1 configured for cleaning an exhaust gas from an internal combustion engine.

10. A carrier body, comprising the electrically heatable honeycomb body according to claim 1, said honeycomb body having electrically insulating layers and being electrically connected to at least one electrode, and forming therein a predetermined current path, and a substantially tubular casing at least partially surrounding said honeycomb body.

11. The carrier body according to claim 10, wherein said at least one electrode is guided in an electrical insulation through said tubular casing.

12. The carrier body according to claim 10, wherein said electrically insulating layers are formed, at least in part, by air gaps.

13. The carrier body according to claim 10, which comprises support structures for at least partially delimiting said electrically insulating layers.

14. A catalytic converter assembly, comprising a carrier body having an electrically heatable honeycomb body according to claim 1 and a main catalytic converter disposed downstream of said heatable honeycomb body in a flow direction.

15. The catalytic converter assembly according to claim 14, wherein said main catalytic converter is a three-way catalyst.

16. The catalytic converter according to 14, wherein said carrier body with said electrically heatable honeycomb body is braced against said main catalytic converter.

* * * * *